March 30, 1965 K. R. MACHEIN ETAL 3,176,067

SYSTEM FOR EDITING MAGNETIC TELEVISION RECORDINGS

Filed May 1, 1961 4 Sheets-Sheet 1

KURT R. MACHEIN &
NORMAN F. BOUNSALL
INVENTORS

BY Nathan N. Kallman

ATTORNEY

SYSTEM FOR EDITING MAGNETIC TELEVISION RECORDINGS

KURT R. MACHEIN &
NORMAN F. BOUNSALL
INVENTORS

BY Nathan N. Kallman

ATTORNEY

SYSTEM FOR EDITING MAGNETIC TELEVISION RECORDINGS

Filed May 1, 1961 4 Sheets-Sheet 3

KURT R. MACHEIN &
NORMAN F. BOUNSALL
INVENTORS

BY Nathan N. Kallman

ATTORNEY

March 30, 1965 K. R. MACHEIN ETAL 3,176,067

SYSTEM FOR EDITING MAGNETIC TELEVISION RECORDINGS

Filed May 1, 1961 4 Sheets-Sheet 4

KURT R. MACHEIN &
NORMAN F. BOUNSALL
INVENTORS

BY Nathan N. Kallman

ATTORNEY 3,176,067

SYSTEM FOR EDITING MAGNETIC TELEVISION RECORDINGS

Kurt R. Machein and Norman F. Bounsall, Palo Alto, Calif., assignors to Ampex Corporation, Redwood City, Calif., a corporation of California Filed May 1, 1961, Ser. No. 106,573
9 Claims. (Cl. 178—6.6)

This invention relates to an editing system, and in particular to an electronic method and means for editing a recorded magnetic tape.

In the magnetic recording field, a magnetic tape apparatus such as described in U.S. Patent 2,866,012 is generally employed for recording and reproducing video or television signals. Such a system may incorporate a rotary drum assembly carrying a plurality of equally spaced magnetic heads at its periphery to scan a longitudinally moving magnetic tape transversely for recording a signal or for reproducing the recorded signal information on successive parallel tracks. In order to prepare the magnetic tape for recording, an erase head is disposed prior to the recording drum assembly in the path of the moving magnetic tape.

The system may incorporate a servo system wherein a photoelectric cell senses the rotational velocity of the rotary head drum and produces a 240 cycle square wave output, the phase of which is directly dependent upon the instantaneous position of the head drum. During the "Record" mode in a conventional television recording apparatus, the output of the photoelectric cell serves to lock the frequency of the rotating capstan that drives the magnetic tape to the frequency of the rotating head drum. Also, the output of the photoelectric cell is recorded along one edge of the magnetic tape as a 240 cycle control track. During the "Playback" mode, the photoelectric cell output is compared in phase with the reproduced control track signal to vary the rotational velocity of the capstan so that the relative speed between the longitudinally moving tape and the head drum is identical with the relative speed that existed during "Record."

Many times after recording a sequence of information signals, such as may represent scenes of a dramatic play for example, it may be desirable or necessary to change a portion of the recorded material as a result of a poor "take." In one approach to editing a recorded magnetic tape according to present practice, the scene is "taken" again, recorded on another length of tape, and interposed in the original tape as an "insert" by mechanical splicing and editing methods. Also, the program director or producer may wish to add some more program material to fill in time, and therefore an additional length of recorded tape may be joined to the end of the master tape by an "assembly" process. In either event, whether an insert or an assembly is contemplated, the problems encountered are substantially the same. These problems arise from present methods of splicing and editing, which to the most part are mechanical and dependent on skilled human operation, although some electronic aids are used.

In order to achieve editing by mechanical means, a system such as described in U.S. Patent 3,037,073 employs editing pulses that are synchronized with vertical synchronizing pulses derived from a television signal to be recorded. These editing pulses are registered at the edge of the magnetic tape concurrently with a control track signal and may be made visible by the application of a special metallic powder whereby there is provided a visual indication of the exact position that a splice should be made. In such a system, the splice is made coincident with an editing pulse marker that appears between each vertical field of a television picture. The editing pulses that occur during the vertical blanking period serve to maintain a precise timing relation between new information introduced by insertion or assembly and the original recorded information. To effect such maintenance of precise timing, the visible pulse marker must be aligned to a precise position with the aid of a micrometer or magnifying viewing glass, the tape must be rigidly held and clamped in this position, and then cut to extremely fine dimensional tolerances. After the ends of the magnetic tape have been cut, the ends must be joined by a narrow piece of splicing tape that is applied across the backing of the magnetic tapes to be joined.

Thus, it is seen that editing by mechanical splicing is usually tedious, time-consuming and subject to inaccuracies since the method is dependent upon the skill of the splicing operator and the condition of the editing apparatus. Also, the use of splicing tape makes the magnetic tape at the spliced area subject to rapid wear as it traverses the recording or reproducing heads. Furthermore, the variation in thickness of the magnetic tape at the splice may cause variations in the angular velocity of the rotary head drum, which may result in hunting or rollover of the television picture.

It would be very desirable to provide an editing system that is substantially controlled by electronic circuitry wherein mechanical splicing may be eliminated. Also, in order to conserve magnetic tape, it would be more economical to re-record a new scene over a previously recorded scene that is to be eliminated from the originally recorded tape. However, it is still necessary to establish a correct timing relation on the magnetic tape between the synchronizing signals of a previously recorded television signal and those of a new television signal to be recorded so that no rollover occurs during the presentation of the transmitted television picture.

In U.S. Patent 3,017,462 a synchronizing system, called the "Intersync" synchronizer, is set forth wherein a magnetic tape apparatus is synchronized with an independent information processing apparatus, which may be another magnetic tape machine or a television camera employed for the pickup of a live show in a studio for example. The synchronizing system receives a synchronizing signal having a plurality of signal components from the magnetic tape apparatus. A first component is used to provide a relatively coarse adjustment of the rotational velocity of the rotary head scanning means of the tape apparatus to synchronize the presentation of information from the tape with the other source of signal information. The second component, which has a substantially greater frequency than the first component, is used to provide a relatively fine adjustment. As applied to television transmission, the synchronizing signals may be the vertical and horizontal synchronizing components respectively of a composite video information signal. Such a synchronizing system is very useful for providing synchronization between a plurality of information sources. However, to effect such synchronization it is necessary that the magnetic tape apparatus be operated continuously during the synchronizing process. But for editing purposes, the tape apparatus must be stopped and started several times, and therefore special means must be provided to bring the recording tape apparatus and the originally recorded information into proper time relationship with the new portions or segments of signal information that are being inserted or assembled with the master tape.

An object of this invention is to provide an improved and novel magnetic tape editing method and system.

Another object of this invention is to provide an electronic editing system that lends itself to rapid and accurate editing of a recorded magnetic tape.

Another object of this invention is to provide an electronic editing system wherein mechanical splicing is substantially eliminated.

Another object is to provide a system for editing a magnetic tape that has signal information recorded thereon so that precise synchronization of new recorded information relative to the previously recorded information is maintained.

A further object of this invention is to provide an electronic editing system whereby a minimum of skilled operation is required.

A further object is to provide an electronic editing system whereby magnetic tape is conserved during an editing process.

A still further object is to provide an electronic editing system that may be adapted for video signal processing, such as fade in and fade out, dissolves, split screen, and the like.

In accordance with this invention, an electronic editing system for a magnetic tape apparatus incorporates a delay means for delaying the energization of a rotary head assembly so that actual recording of new video or television signal information may be precisely synchronized with previously recorded information on a magnetic tape. An "AND" gate that is actuated by the coincident input of a delay pulse signal supplied by the delay means and a synchronizing pulse signal derived from the previously recorded video signal causes the recording heads to be activated such that recording begins precisely at a time corresponding to the occurrence of the synchronizing pulse signal, which may be a vertical synchronizing pulse of a television signal.

As applied to television recording wherein electronic editing is used in accordance with this invention, when new video information is interposed or inserted between two portions of previously recorded information by re-recording over a portion of old information, a control track signal that had been continuously registered on the magnetic tape for controlling the rotational velocity of the capstan drive assembly during "playback" is preserved, although the old video information is erased. Thus, precise synchronization is maintained between new inserted information and previously recorded information during the playback of the final master record, because the vertical synchronizing pulses and the control track are in proper time relationship. In order to preserve the control track signal while erasing the old viedo information, a dual erase head is employed comprising an erasing part that effects erasure only of the transverse tracks representing video information recorded on a magnetic tape without erasure of the control track registered at the edge of the tape.

When new video information is added or assembled to the master tape, then a supplemental control track is recorded in proper time relation with the originally recorded control track. In either event, whether an insert or an assembly is introduced to the master recorded tape, a continuous control track is ultimately registered having a true phase relation to the final continuously recorded video information.

The invention will be described in greater detail with reference to the accompanying drawing in which.

Figure 1:
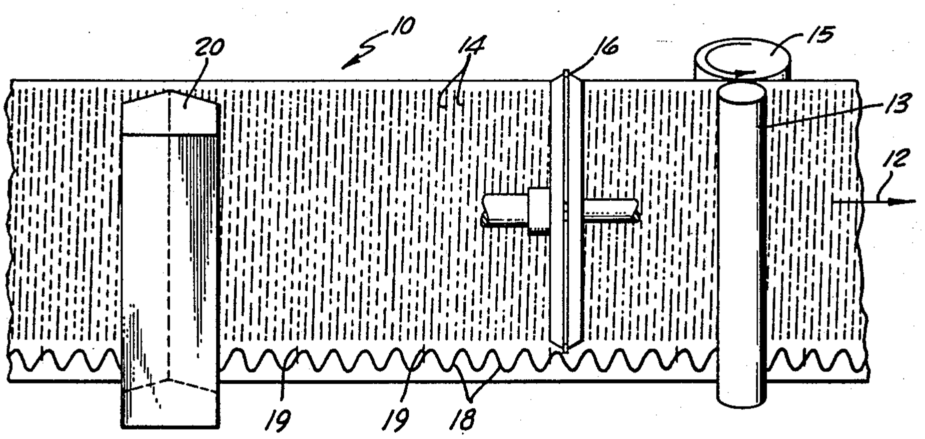
FIGURE 1 is a plan view of a recorded magnetic tape, shown in relation to a rotary head assembly and an erase head employed in a television magnetic tape recorder.

In FIGURE 1, a master magnetic tape 10 that is moved in the direction of the indicating arrow 12 by means of a rotating capstan 13 and cooperating pinch roller 15 from a supply reel (not shown) to a takeup reel (not shown) has video signal information registered thereon in the form of spaced transverse tracks 14 previously recorded by means of a rotary head assembly 16, in a manner described heretofore and in U.S. Patent No. 2,866,012. In accordance with well known video recording practice, the tape 10 has a control track 18 established at one edge that is normally employed for controlling the tape capstan speed during Playback, and in addition, editing pulses 19 that are superimposed on the control track 13. An erase head 20 is spaced closely from the rotary head drum 16 between the drum 16 and the supply means, and is located at such a distance that it takes the tape 10 about one half second to move from the erase head 20 to the head drum 16. It is noted that when the tape 10 has information registered across its entire length, if an insertion is later made on an intermediate portion of the tape, then duplicate information would be registered on that segment located between the rotary head assembly 16 and the erase head 20 at the beginning of the re-recording. Conversely, when the re-recording is terminated, there would be a segment that lies between the rotary head assembly 16 and the erase head 20 having no recorded material thereon when the tape 10 has come to rest.

In operation when inserting new material, the recorded tape 10 is first rewound onto the supply reel of the tape apparatus so that at least ten seconds of information may be viewed on a visual monitor before actual re-recording will be effected. After rewinding, the tape apparatus is run for several seconds in the "Playback" mode, and the "Intersync" synchronizer described in U.S. Patent 3,017,462 serves to synchronize the frequency and phase of the head drum 16 with that of the tape capstan. Also, the signal recorded on the tape is synchronized relative to an external reference, which may be a studio tuning generator. Thus, the control track 18 that was previously derived during the original recording by sensing the angular velocity of the rotary head assembly 16 is employed to maintain the head drum 16 in proper synchronous relation with the tape capstan and the longitudinally moving tape 10.

Figure 3:
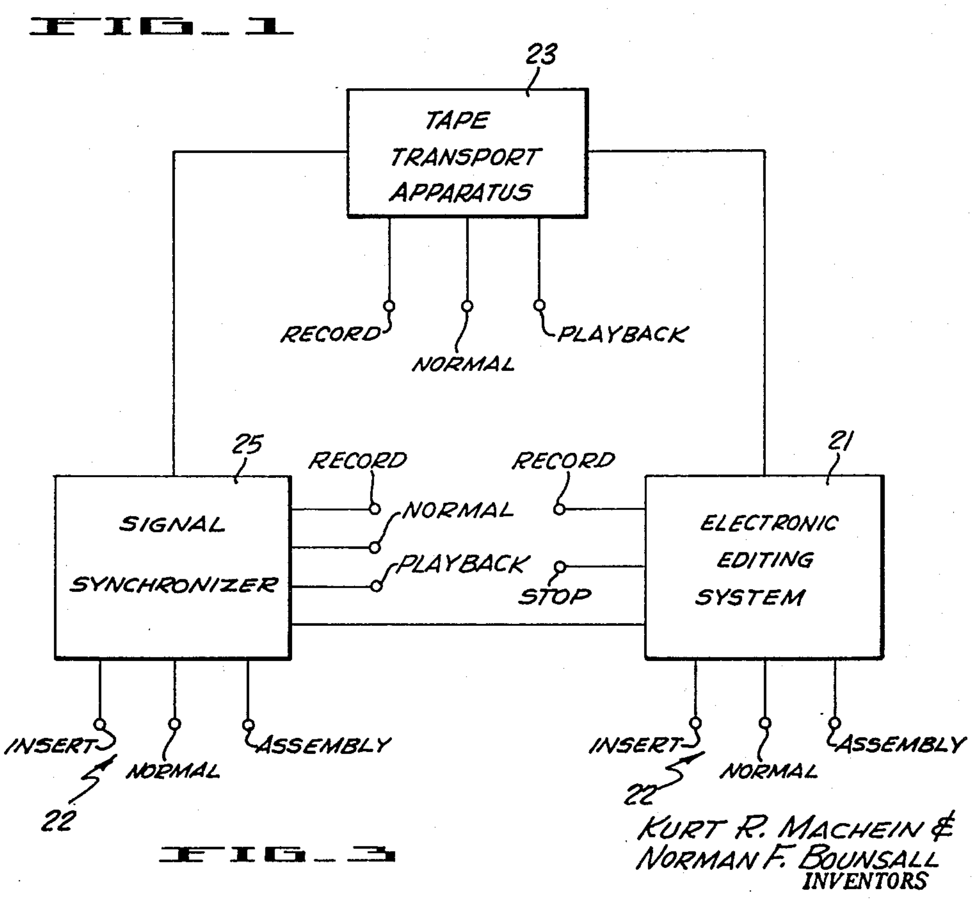
FIGURE 3 is a functional block diagram of a tape transport system including the electronic editing system.
Figure 2:
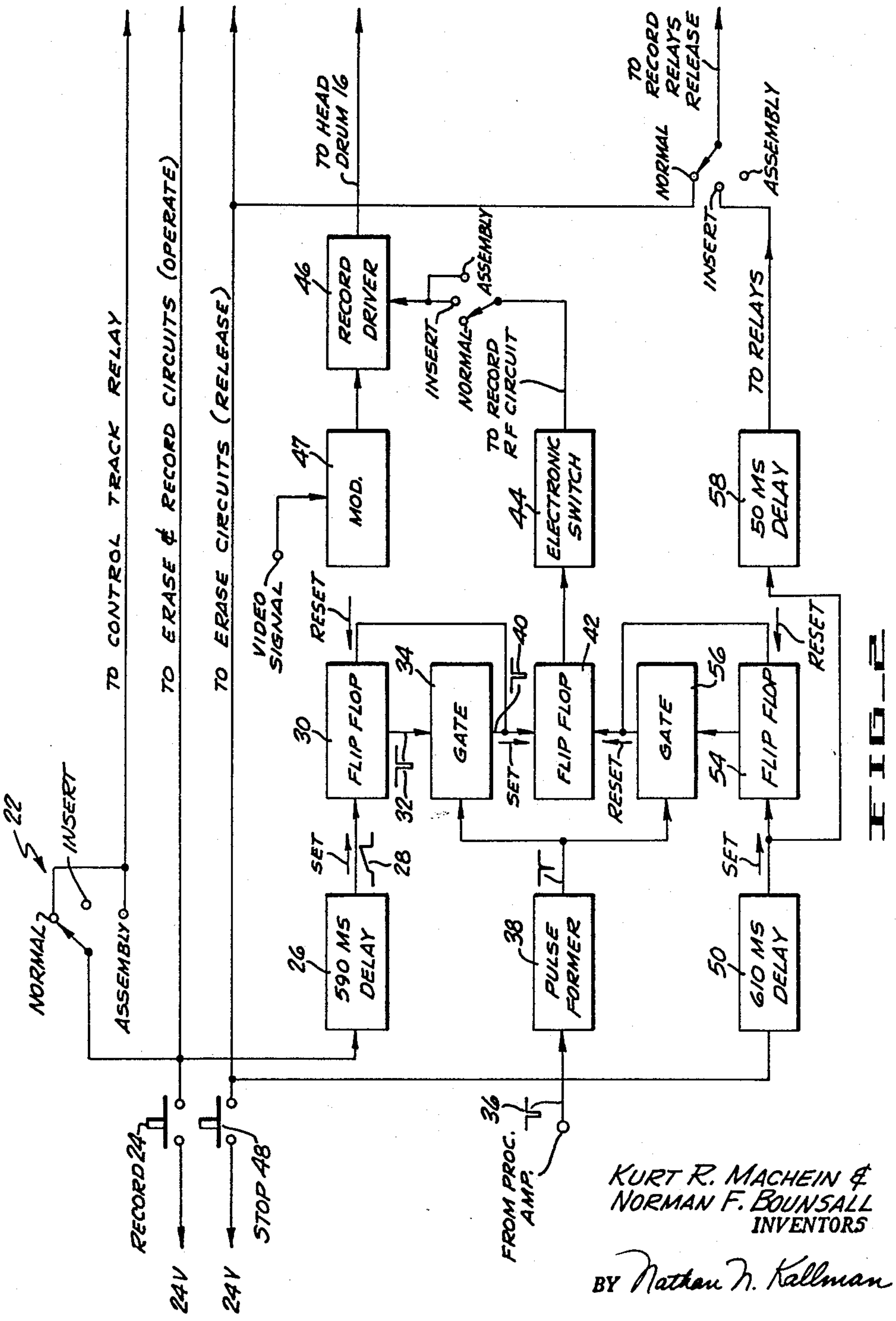
FIGURE 2 is a block diagram of an electronic editing system, according to this invention.
Figure 4:
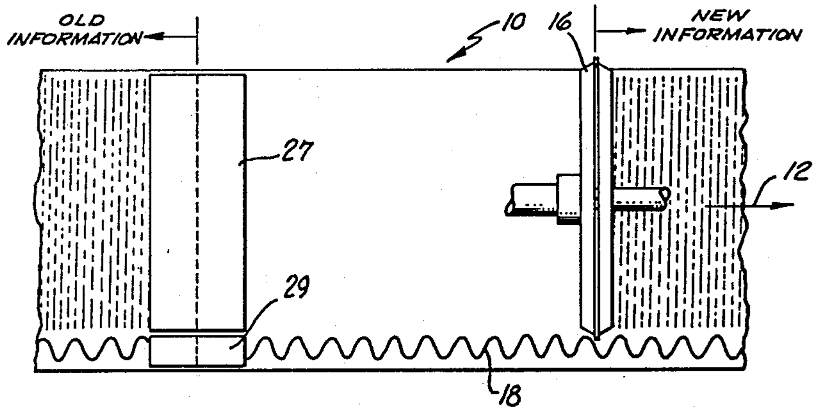
FIGURE 4 is a series of waveforms illustrating the operation of the editing system of FIGURE 2.

After the electronic editing system 21 shown in FIGURES 2 and 3 is set in the "Insert" mode by switching means 22, thereby coupling the editing system 21 to the control circuits of the magnetic tape apparatus 23 and the "Intersync" synchronizer 25, the capstan 13 is activated to drive the tape 10. The recorded tape is brought into synchronism with the rotary drum 16 under the control of the control track signal 18. About one half second before the actual insertion of the new video information is to begin, a "Record" switch 24 is engaged to energize the editing system 21 for controlling the "insertion" recording process. In this record mode, an erase head part 27 that erases only the transverse tracks 14 and video signal but leaves the control track 18 intact, as shown in FIGURE 4, is energized. When desired, an auxiliary erase head part 29 allows erasure of the control track 18.

simultaneously with the erasure of the video information, as in conventional apparatus.

The signal from the control track 18 is utilized by the "Intersync" synchronizer 25 to control the capstan rotational speed relative to the rotary velocity of the head drum 16. Thus in the "insert" record mode, the 60 cycle per second oscillator that controls the capstan speed is varied in accordance with an error phase signal that is derived by comparing the head drum 16 position with a reference signal. In this manner, the newly inserted information is registered in proper relation with the original recorded information.

With the Record switch 24 engaged, a 590 millisecond delay circuit 26 is activated to provide a sawtooth waveform 28, such as shown in FIGURE *5a*. The negative going trailing edge of the sawtooth output 28 of the delay circuit 26 triggers a flip-flop circuit 30 or bistable multivibrator that develops a negative going pulse 32, illustrated in FIGURE *5b*. The negative going pulse 32, which has a decay time of substantially 16.6 milliseconds or approximately that of a vertical field of a television signal, is applied to an AND gate 34. At the same time, a vertical synchronizing pulse 36, such as shown by FIGURE *5c*, is derived from a processing amplifier (not shown) in the magnetic tape apparatus 23 and the trailing edge of the pulse 36 is shaped by a pulse former 38 that provides a narrow negative pulse. The shaped negative pulse is applied to the AND gate 34 causing the gate to open when the vertical pulse 36 is coincident with the negative pulse 32. When open, the AND gate 34 supplies a narrow pulse 40 of about 3 milliseconds (FIGURE *5d*) to trigger a flip-flop circuit 42 that produces a negative voltage, as shown in FIGURE *5e*, which actuates an electronic switch 44. The electronic switch 44 supplies a control voltage, FIGURE *5f*, through the relay switch 22 so that the radio frequency carrier circuit or record driver 46 coupled to the recording heads of the head drum 16 is energized. At this time, actual recording onto the tape 10 starts whereby new signal information that is supplied to the recording head assembly 16 through a modulator is recorded at the beginning of a vertical field that corresponds with the occurrence of a vertical synchronizing pulse 36.

At the end of the insertion recording, the director or operator depresses a stop switch 48, thereby instantaneously de-energizing the erasing circuits and the erase head part 27. Concurrently, a 610 millisecond delay circuit 50 similar to the delay circuit 26 employed in the record mode is activated to provide a sawtooth signal 52 such as shown in FIGURE *5a*. The sawtooth output 52 triggers a flip-flop circuit 54 that produces a negative pulse 55, such as shown in FIGURE *5b*. The negative pulse is applied to an AND gate 56 that is opened when the input of a sharp negative pulse derived from a vertical synchronizing pulse 36 is coincident with the negative pulse 55, as explained heretofore with respect to the "insertion" record process. The output of the gate 56 is then directed to the bi-stable multivibrator or flip-flop circuit 42, which is reset so that the electronic switch 44 is turned off. Thus, the record driver 46 is de-energized and actual recording onto the magnetic tape 10 is halted at the occurrence of the vertical synchronizing pulse 36, which signifies the beginning of a new vertical field.

Also, the sawtooth output 52 of the delay circuit 50 is applied to a 50 millisecond delay circuit 58 that serves to delay the mechanical control of the "Stop" relays thus allowing the tape 10 to be transported for an additional period of time of approximately 50 milliseconds after the flip-flop 54 has been set. The total delay provided by the delay circuits 50 and 58 affords recording on that segment of the tape 10 that has been subjected to erasure of the video information, but has not as yet passed the recording head 16 at the instant when the stop switch 48 was depressed. In addition, the output of the flip-flop circuit 42 is utilized to reset the flip-flop circuit 30 so that the editing system 21 will be ready for any new recording that is to be added to the tape 10 by insertion or assembly.

When adding entirely new information by assembly, it is then necessary to also add a new control track in continuity with the old control track 18. It is common practice to overshoot the end of a scene being recorded to provide a safety margin so that when recording begins again, a reference to recorded synchronizing signals is available.

When recording by the assembly editing method, the tape apparatus 23 is started in the playback mode at a portion of the tape 10 that has about ten seconds of recorded information prior to the end of the originally recorded tape information. The director or operator observes the reproduced signal on a visual monitor so that he may cue in the new scene at the proper moment. During playback of the originally recorded information, the "Intersync" synchronizer stabilizes the phase and frequency relationship between the head drum 16 and the capstan driving the tape 10 in a similar manner to that described with respect to insertion editing. About one-half second before actual recording is to begin, and with the switch 22 in "assembly" position, the director gives the cueing signal and depresses the record switch 24. The record relays of the tape apparatus 23 and the synchronizer 25 are activated in the same manner as described heretofore with relation to re-recording by insert editing, and the controlled delay and gating system of this invention serves to provide recording of new information that is precisely synchronized with the previously recorded information.

However, in the assembly head process, both erase head parts 27 and 29 are effectively erasing. The erase heads 27 and 29 begin to erase immediately upon engagement of the record button 24 of the editing system 21, thereby erasing about one half second of information prior to the start of actual recording. Thus no overlap of information is recorded on the tape 10.

Since there is no recorded control track on the portion of the tape 10 that is to be recorded with new information, an additional control track is added together with the video information. This is achieved by actuating the control track relay of the magnetic tape apparatus 23 when switching to the assembly mode.

During the initial playback period of the assembly recording process, the phase of the tape capstan is accurate with relation to the control track 18 registered during the original recording on the master tape 10. The capstan is maintained in such accurate relation by a 60 cycle per second oscillator that is incorporated into the "Intersync" synchronizer 25, the oscillator having its frequency varied by an error signal derived by comparing the frequency of the rotating capstan with a reference frequency. However, at the time that the record relay 24 is engaged, the oscillator becomes free running, and assumes its nominal frequency of 60 cycles per second. Although the "Intersync" synchronizing system is switched from a controlled state when there is recorded control track 18 to a free running condition when there is no registered control track, the phase relationship between the capstan and the rotary head assembly 16 is suitably maintained since variations in the frequency of the new control track registered during the free running condition of the oscillator are referenced to the spacings between the transverse recorded tracks 14 registered by the rotary head assembly 16. Therefore, when the completed master tape 10 is played back, the control track signal acts to maintain a proper phase relation continuously between the tape capstan and the head drum 16.

Figure 6:
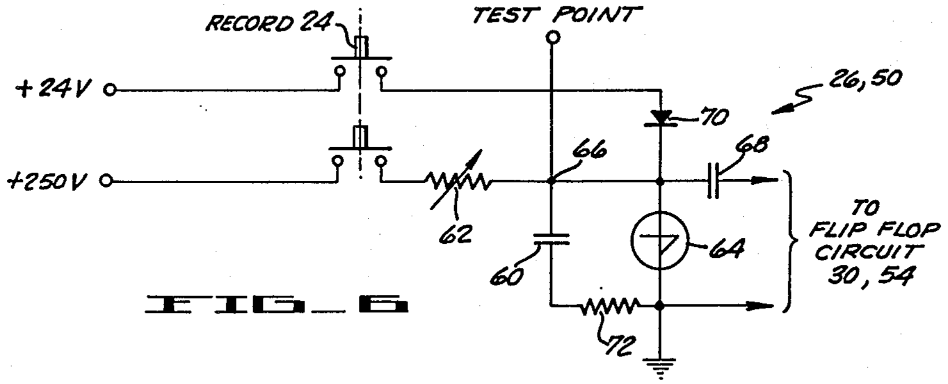
FIGURE 6 is a schematic diagram of a delay circuit, such as may be utilized in the editing system represented in FIGURE 2.
Figure 5:
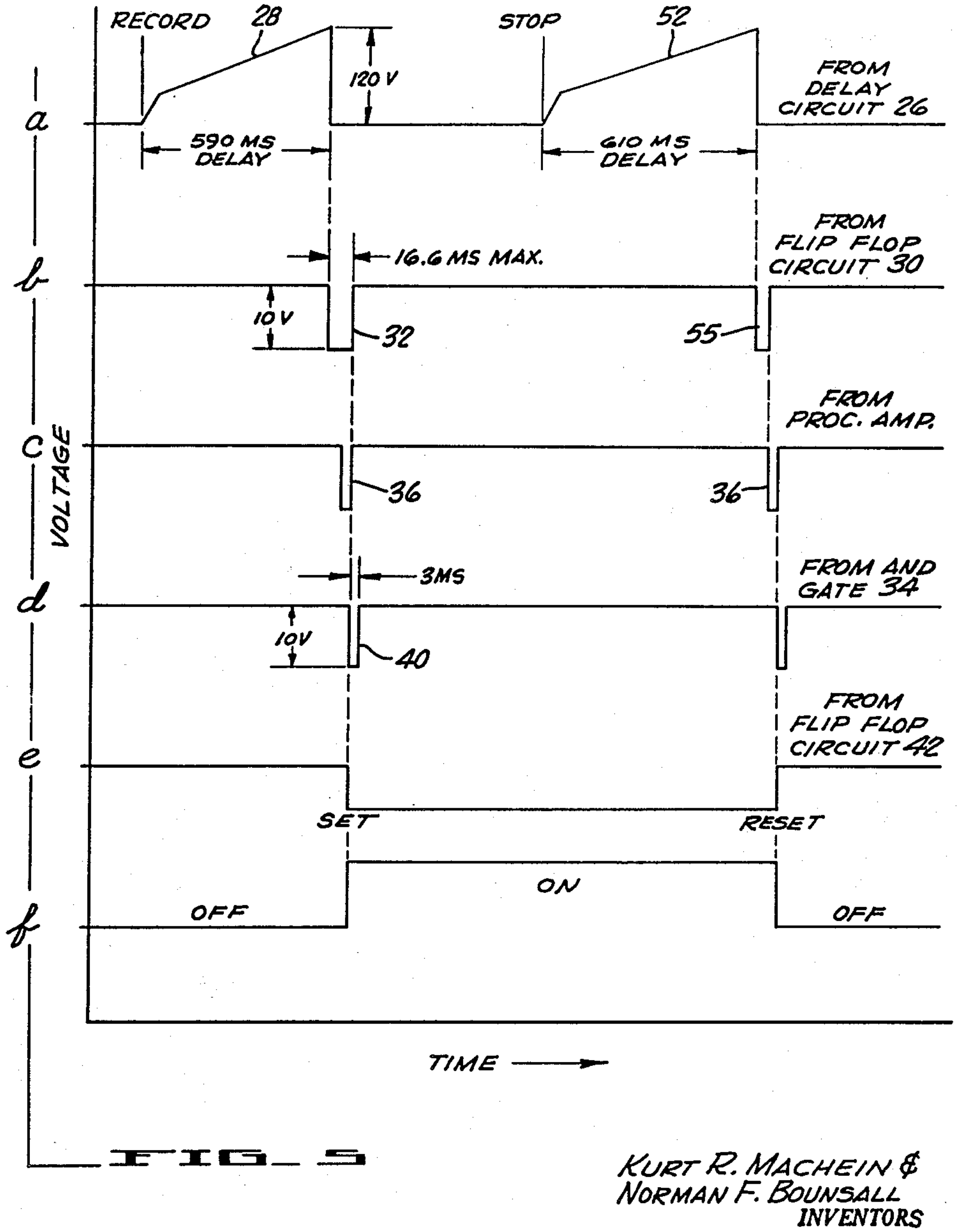
FIGURE 5 illustrates the use of a dual erase head assembly as employed with the system of this invention.

An example of a delay circuit 26, 50 such as shown in block in FIGURE 2, is set forth in the schematic of FIGURE 6. With the record button 24 depressed, a power source supplies a voltage of 250 volts to charge a capacitor 60 thru a variable resistance 62. A Shockley four layer transistor diode 64 having a high impedance is switched on when the voltage at a junction point 66 reaches the transistor switching voltage, which may be about 120 volts. The internal resistance of the transistor 64 causes the voltage at the junction 66 to fall to zero thus generating a negative going pulse that is channeled through a capacitor 68 to trigger the flip-flop circuit 30, 54. The resultant waveforms are represented in FIGURES 5*a* and 5*b*.

A diode 70 that is biased by a 24 volt supply provides a holding current for the transistor 64, and a resistance 72 limits the discharge of the capacitor 60 through the transistor 64.

Figure 7:
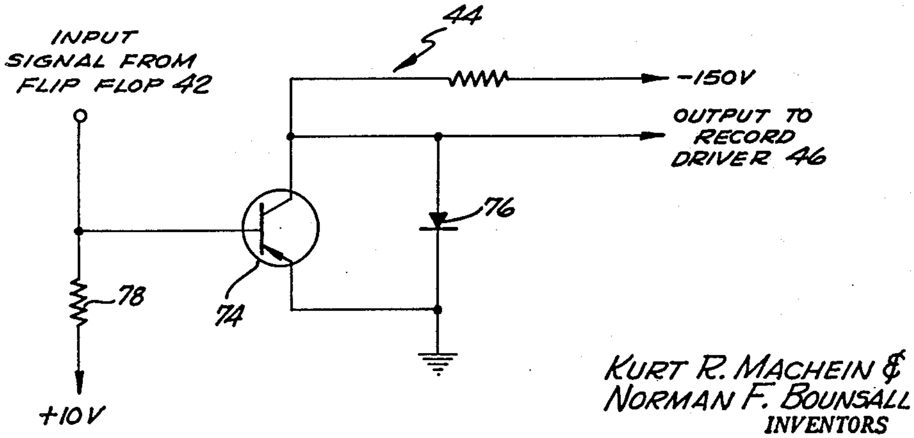
FIGURE 7 is a schematic diagram of an electronic switch that may be employed in the same system of this invention.

In FIGURE 7, an electronic switch 44 comprises a PNP transistor 74 having a Zener diode 76 connected across the emitter and collector. The switch 44 is normally off in the absence of an input signal by virtue of the positive voltage supplied to the transistor base through the resistor 78. However, whenever an input signal is derived from the flip-flop circuit 42 and applied to the transistor base, an output signal is applied to the record driver 46. The Zener diode 76 limits the collector potential to a predetermined voltage, such as minus 19 volts thus biasing the record driver 46 to cut off. The resistance of the collector and the emitter falls to a few ohms and the collector potential goes to ground thereby removing the bias voltage from the record driver 46, allowing the driver to conduct thus energizing the magnetic heads for recording.

It is understood that the scope of the invention is not limited to the specific values or circuit configurations set forth above. The delay intervals provided by the delay circuits need be only long enough to afford movement from the erase head to the rotary head assembly before actual new recording is to take place. And at such time that actual recording is effected, the tape capstan must be in precise phase and frequency relation relative to the magnetic transducer or head drum.

What is claimed is:

1. An electronic editing system for a magnetic tape apparatus having magnetic record transducers comprising: means for delaying the energization of the record circuit of said transducers for a predetermined time; and means for energizing the record circuit in response to a synchronizing pulse that is applied to such delaying means so that actual recording commences when the synchronizing pulse occurs.

2. An electronic editing system for a magnetic tape apparatus having magnetic record transducers and a magnetic tape with a recorded video signal including a sychronizing signal comprising: means for delaying the energization of the record circuit of said transducers for a predetermined time; means for deriving said synchronizing signal from said recorded tape; and means for energizing the record circuit in response to said derived synchronizing signal that is applied to such delaying means so that actual recording commences when the synchronizing signal occurs.

3. An electronic editing system for a magnetic tape apparatus having a rotary head drum and a capstan for driving a tape having recorded signal information thereon comprising: means for energizing the head drum to cause rotation thereof and the capstan to drive the tape; synchronizing means coupled to said editing system and said tape apparatus for synchronizing the phase and frequency of said recorded signal on the driven tape relative to the rotation of said drum; and a delay and gating means for energizing the record circuits of said head drum at a predetermined time so that new signal information may be registered in synchronism with the previously recorded information.

4. An electronic editing system for a magnetic tape apparatus having a rotary head drum and a capstan for driving a tape having recorded signal information thereon comprising: means for energizing the head drum to cause rotation thereof and the capstan to drive the tape; synchronizing means coupled to said editing system and said tape apparatus for synchronizing the phase and frequency of said recorded signal on the driven tape relative to the rotation of said drum; means for deriving a synchronizing signal from said recorded signal information; and a delay means for energizing the record circuits of said head drum in response to said synchronizing signal so that new signal information is recorded in coincidence with the occurrence of such synchronizing signal.

5. An electronic editing system for a magnetic tape apparatus having magnetic record transducers for recording on a master tape comprising: means for providing a delay signal; means for generating a pulse signal in response to said delay signal, said pulse signal having a maximum decay time not exceeding the period of a vertical television field; means for deriving a vertical synchronizing signal from a previously recorded television signal on the master tape; gating means for controlling the energization of the recording circuit associated with said record transducers; means for applying said pulse signal and said synchronizing signal to said gating means so that said gating means conducts when said pulse and synchronizing signals are coincident thereby effecting recording commencing with the occurrence of the synchronizing signal.

6. An electronic editing system for a magnetic tape apparatus having a rotary head drum and a capstan for driving a magnetic tape having a video signal including synchronizing signals recorded thereon comprising: means for activating the transporting means of the tape and the rotary head drum; means for synchronizing the phase and frequency of said recorded video signal on the tape with the rotating head drum; means for switching said tape apparatus into the record mode; a delay means for delaying actual recording onto the tape; gating means coupled to the output of said delay means; means for applying a synchronizing signal to said gating means so that said gating means conducts upon coincidence of said synchronizing signal and the output signal from said delay means; and switching means responsive to said gating means when conducting for energizing the recording circuitry associated with said head drum such that actual recording begins coincidently with the occurrence of a synchronizing signal.

7. An electronic editing system for a magnetic tape apparatus having a rotary head drum and a capstan for driving a magnetic tape having a video signal including synchronizing signals recorded thereon comprising: means for driving said rotary head drum and said recorded tape in proper phase relationship in the playback mode; means for delaying the actual recording of new information when switching to the record mode; means for commencing actual recording upon application of a synchronizing signal derived from said recorded tape to said delay means; means for stopping said recording operation comprising means for delaying the de-energization of the record circuit associated with said head drum; and means for terminating actual recording upon application of said synchronizing signal to said de-energization delaying means.

8. The method of electronically editing a master magnetic tape in a magnetic tape apparatus having a video signal including synchronizing pulses recorded thereon, said tape being driven by a capstan and transported adjacent to a rotary head assembly for recording signal information comprising the steps of: activating the tape apparatus into the playback mode and synchronizing the moving tape and head assembly by referencing the synchronizing pulse; switching the tape apparatus to the record mode; delaying the energization of the recording head circuit for a predetermined time; and commencing actual recording upon the occurrence of a synchronizing pulse derived from the recorded video signal.

9. In an electronic editing system for a magnetic tape apparatus having an erase head and a rotary recording head assembly, and a capstan for driving the magnetic tape, a method for editing the magnetic tape by adding new signal information comprising the steps of: synchronizing the rotating recording head assembly with the driven tape having recorded information thereon; switching the magnetic tape apparatus into the record mode; delaying the actual recording for an interval substantially equal to the time it takes the tape to travel from the erase head to the recording head assembly; and energizing the recording head circuitry during such interval in response to a synchronizing signal to thereby commence actual recording.

No references cited.

DAVID G. REDINBAUGH, *Primary Examiner.*

ROY LAKE, *Examiner.*